United States Patent
Kasuya

(10) Patent No.: US 8,477,236 B2
(45) Date of Patent: Jul. 2, 2013

(54) LENS APPARATUS TO BE MOUNTED ONTO CAMERA AND CAMERA SYSTEM WITH LENS APPARATUS

(75) Inventor: Junichi Kasuya, Ageo (JP)

(73) Assignee: Canon Kabushiki Kaisha (JP)

( * ) Notice: Subject to any disclaimer, the term of this patent is extended or adjusted under 35 U.S.C. 154(b) by 58 days.

(21) Appl. No.: 12/878,518

(22) Filed: Sep. 9, 2010

(65) Prior Publication Data

US 2011/0075019 A1 Mar. 31, 2011

(30) Foreign Application Priority Data

Sep. 29, 2009 (JP) ................. 2009-225546

(51) Int. Cl.
*H04N 5/225* (2006.01)
*H04N 5/232* (2006.01)

(52) U.S. Cl.
USPC .......... 348/372; 348/211.8; 348/335

(58) Field of Classification Search
USPC ............ 348/372, 373, 335, 211.8
See application file for complete search history.

(56) References Cited

U.S. PATENT DOCUMENTS

| | | | | |
|---|---|---|---|---|
| 5,523,784 A | * | 6/1996 | Nagano | 348/335 |
| 2004/0061931 A1 | * | 4/2004 | Kallhammer et al. | 359/362 |
| 2008/0284862 A1 | * | 11/2008 | Kogane et al. | 348/211.8 |
| 2010/0228238 A1 | * | 9/2010 | Brennan et al. | 606/13 |
| 2010/0231778 A1 | * | 9/2010 | Hirai | 348/335 |

FOREIGN PATENT DOCUMENTS

JP 2005-266717 A 9/2005
JP 2005-352281 A 12/2005

* cited by examiner

*Primary Examiner* — Hung Lam
(74) *Attorney, Agent, or Firm* — Rossi, Kimms & McDowell LLP

(57) ABSTRACT

A lens apparatus 200 includes an image-pickup optical system 202, 204, an optical element 210 capable of being inserted into and extracted from the image-pickup optical system, an actuator 212 which moves the optical element so as to be inserted into and extracted from the image-pickup optical system, and a controller 201 which operates the actuator in accordance with an insert/extract command signal which instructs insertion and extraction of the optical element. The controller limits an operation of the actuator in accordance with an input of the insert/extract command signal during recording or broadcasting an image taken by a camera 100 using the lens apparatus.

6 Claims, 7 Drawing Sheets

LENS APPARATUS TO BE MOUNTED ONTO CAMERA AND CAMERA SYSTEM WITH LENS APPARATUS

BACKGROUND OF THE INVENTION

1. Field of the Invention

The present invention relates to a lens apparatus which is used by being mounted onto a camera.

2. Description of the Related Art

Japanese Patent Laid-open Nos. 2005-266717 and 2005-352281 disclose a lens apparatus used as a camera system which records a moving image for a television broadcast.

In the lens apparatus disclosed in Japanese Patent Laid-open No. 2005-266717, each of optical adjustment function such as an iris (an aperture stop), zoom, IE, focus, and macro is controlled via a motor. Japanese Patent Laid-open No. 2005-266717 also discloses a tally portion which is controlled.

On the other hand, in the lens apparatus disclosed in Japanese Patent Laid-open No. 2005-352281, a tally lamp is turned on to inform a person who is an subject or a staff around of shooting an image using the lens apparatus and a television camera connected with it by turning on a tally lamp.

In shooting a program at a normal studio or broadcasting sports outdoors, a plurality of camera systems including the lens apparatus described above are used to shoot an image in many cases. In this case, commonly, a camera operator who operates each camera system and a person (an image selecting person) who selects an image to be recorded or broadcasted from a plurality of images shot by the plurality of camera systems are arranged at positions different from each other.

The camera operator of each camera system frequently performs a switch of an extender, a zoom operation, and a focus operation, in order to shoot a more powerful image by the camera system operated by the camera operator. Commonly, the camera operator obtains permission from the image selecting person before switching the extender.

However, when the number of the camera systems to be used is large, it is difficult to communicate between each camera operator and the image selecting person. Therefore, the image shot by the camera system during switching the extender, i.e. the image which is out of focus or includes the image of the switching of the extender may be selected to be recorded or broadcasted.

In some cases, a heater embedded in the lens apparatus may be operated in an image-pickup standby state so as not to lose transparency of the lens at the time of broadcasting in winter. However, when the zoom operation or the focus operation is performed without setting the heater to OFF in a case where it is necessary to suddenly start to shoot an image during the operation of the heater, a comfortable shooting cannot be performed due to the shortage of the power for the zoom operation or the focus operation.

SUMMARY OF THE INVENTION

A lens apparatus as one aspect of the present invention includes an image-pickup optical system, an optical element configured to be capable of being inserted into and extracted from the image-pickup optical system, an actuator configured to move the optical element so as to be inserted into and extracted from the image-pickup optical system, and a controller configured to operate the actuator in accordance with an insert/extract command signal which instructs insertion and extraction of the optical element. The controller limits an operation of the actuator in accordance with an input of the insert/extract command signal during recording or broadcasting an image taken by the camera using the lens apparatus.

A lens apparatus as another aspect of the present invention includes an image-pickup optical system, an actuator configured to move a movable lens included in the image-pickup optical system, a heater configured to heat at least apart of the lens apparatus, and a controller configured to operate the heater in accordance with a heater operation command signal which instructs an operation of the heater. The controller limits the operation of the heater in accordance with an input of the heater operation command signal during recording or broadcasting an image taken by the camera using the lens apparatus.

A lens apparatus as another aspect of the present invention includes an image-pickup optical system, an actuator configured to move a movable lens included in the image-pickup optical system, a wiper configured to wipe a front surface of the image-pickup optical system, and a controller configured to operate the wiper in accordance with a wiper operation command signal which instructs an operation of the wiper. The controller limits the operation of the wiper in accordance with an input of the wiper operation command signal during recording or broadcasting an image taken by the camera using the lens apparatus.

A camera system including the lens apparatus and a camera onto which the lens apparatus is removably mounted also constitutes another aspect of the present invention.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

[Embodiment 1]

Figure 1:
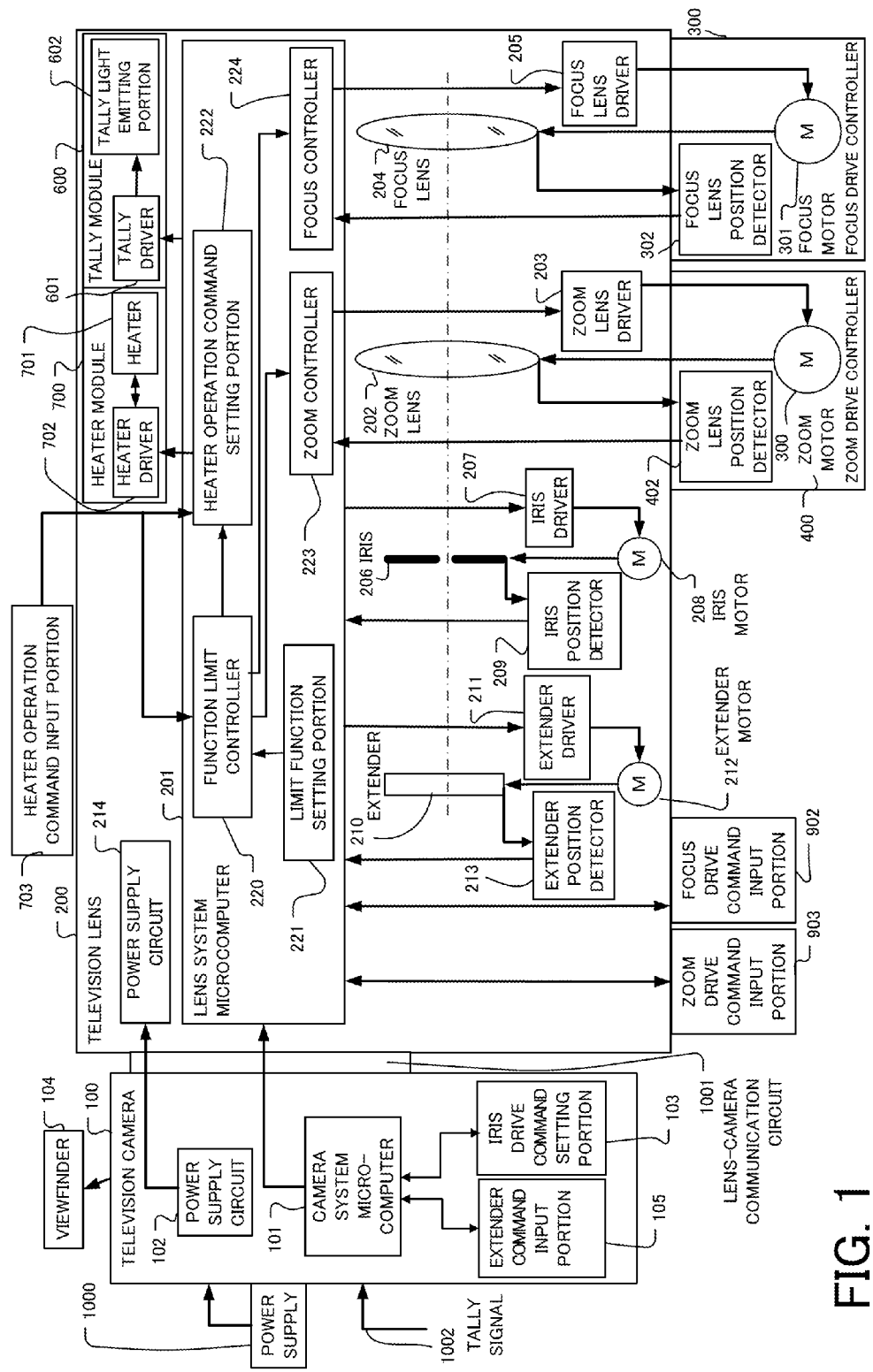
FIG. 1 is a block diagram illustrating a configuration of a camera system that is Embodiment 1 of the present invention.

FIG. 1 illustrates a configuration of a camera system that is Embodiment 1 of the present invention. In the drawing, reference numeral 100 denotes a television camera, which has functions of supplying current to a television lens (a lens apparatus) 200 described below and of taking an image using the television lens 200.

Reference numeral 101 denotes a television system microcomputer which governs a control of each function of the television camera 100. Reference numeral 102 denotes a power supply circuit which generates a power used in each of the functions of the television camera 100 and the television lens 200 using the power supplied from the power supply 1000 described below.

Reference numeral 103 denotes an iris drive command setting portion which sets a drive command of an iris 206 described below. Reference numeral 104 denotes a viewfinder which is removably mounted onto the television camera 100 and displays information such as a shot image.

Reference numeral 105 denotes an extender command input portion which outputs an extender command signal (an insert/extract instruction signal) in accordance with the operation of instructing the insertion and the extraction of an extender 210. The extender command signal from the extender command input portion 105 is inputted to a lens system microcomputer 201 in the television lens 200 via a lens-camera communication circuit 1001 described below.

Reference numeral 1002 denotes a tally signal which indicates that the image taken by the television camera 100 and the television lens 200 is recording or on air (is broadcasting). The tally signal is inputted from a system in a broadcasting station or the like to the television camera 100, and is inputted to the lens system microcomputer 201 via the television system microcomputer 101 and a lens-camera communication circuit 1001 described below.

In the television lens 200, the lens system microcomputer 201 governs the control of each function of the television lens 200. Reference numeral 202 denotes a zoom lens unit as a movable lens which moves in an optical axis direction in order to perform a zooming operation (a magnification varying operation) of the television lens 200. Reference numeral 203 denotes a zoom lens driver which drives a zoom motor 401 described below. The zoom lens driver 203 amplifies a control signal outputted from a zoom controller 223 described below to generate a motor drive signal for driving the zoom motor 401.

Reference numeral 204 denotes a focus lens unit as a movable lens which moves in the optical axis direction in order to perform a focusing operation of the television lens 200. Reference numeral 205 denotes a focus lens driver which drives a focus motor 301 described below. The focus lens driver 205 amplifies a control signal outputted from a focus controller 224 described below to generate a motor drive signal for driving the focus motor 301.

Reference numeral 206 denotes an iris (an aperture stop) which performs a light intensity adjustment, and reference numeral 207 denotes an iris driver which drives an iris motor 208 described below. Reference numeral 208 denotes the iris motor which receives an output of the iris driver 207 to drive the iris 206. Reference numeral 209 denotes an iris position detector which is constituted of an encoder, a potentiometer, or the like, and detects a position of the iris 206.

The zoom lens unit 202, the focus lens unit 204, the iris 206, and other lens units (not shown) constitute an image-pickup optical system.

Reference numeral 210 denotes an insertable/extendable extender lens with respect to the image-pickup optical system (an optical element: hereinafter, also referred to as simply an extender), and reference numeral 211 denotes an extender driver which drives an extender motor 212 described below. The extender 210 is inserted into the image-pickup optical system to extend a focal length of the image-pickup optical system at a predetermined magnification. Commonly, when a large-sized television lens is used, two or three extender lens elements having different magnifications from each other are held on a turret rotatably provided in the television lens. The turret is rotated to be able to insert an arbitrary extender lens element into the image-pickup optical system or to extract all the extender elements from the image-pickup optical system.

Reference numeral 212 denotes an extender motor as an actuator which receives an output of the extender driver 211 to rotate the turret to move the extender 210 for the insertion and the extraction with respect to the image-pickup optical system. Reference numeral 213 denotes an extender position detector which is constituted of an encoder, a potentiometer, or the like, to detect a position of the extender 210 (a rotational position of the turret).

The extender command signal from the extender command input portion 105 is inputted to the lens system microcomputer 201 via the lens-camera communication circuit 1001. The lens system microcomputer 201 drives the extender motor 212 so that the extender 210 according to the inputted extender command signal is inserted into the image-pickup optical system to rotate the turret. Thus, switching the extender lens element that is to be inserted and extracting all the extender lens elements are performed. In the embodiment, switching and extracting the extender lens element are collectively referred to as insertion and extraction of the extender 210.

While the insertion and the extraction of the extender 210 are performed, attention is necessary for the insertion and the extraction of the extender 210 because the shot image is out of focus or the image of rotating the turret (the insertion and the extraction of the extender 210) is contained in the shot image.

Reference numeral 214 denotes a power supply circuit which generates a power supply used for each function of the television lens 200 based on a power supplied from the power supply circuit 102 of the television camera 100 via the lens-camera communication circuit 1001 described below.

Reference numeral 220 denotes a function limit controller which detects a status of the input tally signal to limit various kinds of functions of the television lens 200. In the present embodiment, the function limit controller 220 limits a heater function (a heater operation), a zoom control function (a zoom operation), and a focus control function (a focus operation).

Reference numeral 221 denotes a limit function setting portion (a selector) which sets (selects) whether or not the function limit by the function limit controller 220 is set to be effective.

Reference numeral 222 denotes a heater operation command setting portion. The heater operation command setting portion 222 sets the "operation" and "stop" of a heater 701 described below, based on a heater operation command signal or a heater stop command signal inputted from a heater operation input portion 703 described below and a heater limit signal outputted from the function limit controller 220.

When the heater limit signal is ON, the heater operation command setting portion 222 does not output a control signal for operating the heater 701 to the heater driver 702 regardless of the input from the heater operation command input portion 703, i.e. even if the heater operation command signal is inputted. Thus, the operation of the heater 701 is limited. On the other hand, when the heater limit signal is OFF, the heater operation command setting portion 222 outputs a control signal for operating the heater 701 to the heater driver 702 in a case where the heater operation command signal is inputted from the heater operation command input portion 703. When the heater stop command signal is inputted from the heater operation command input portion 703, the heater operation command setting portion 222 outputs a control signal for stopping the operation of the heater 701 to the heater driver 702.

Reference numeral 223 denotes a zoom controller which controls the drive of the zoom lens unit 202 (the zoom motor 401). The zoom controller 223 controls the drive of the zoom lens unit 202 using a zoom command signal inputted from a zoom drive command input portion 903 described below and position information of the zoom lens unit 202 detected by a zoom lens position detector 402. Hereinafter, the position of the zoom lens unit 202 is also referred to as a zoom lens position.

The zoom controller 223 limits a drive control function (a zoom control function) of the zoom lens unit 202 in accordance with the zoom limit signal outputted from the function limit controller 220. When the zoom limit signal is ON, the zoom controller 223 does not output a control signal for moving the zoom lens unit 202 to the zoom lens driver 203, regardless of the input from the zoom drive command input portion 903. In other words, the zoom controller 223 does not output the control signal even if the zoom command signal is inputted. Or, even if the zoom controller 223 outputs the control signal, a current zoom position is maintained.

When the zoom limit signal is OFF, the zoom controller 223 outputs a control signal for moving the zoom lens unit 202 to the zoom lens driver 203, in accordance with the zoom command signal from the zoom drive command input portion 903.

Reference numeral 224 denotes a focus controller which controls the drive of the focus lens unit 204 (the focus motor 301). The focus controller 224 controls the drive of the focus lens unit 204 using a focus command signal inputted from a focus drive command input portion 902 described below and position information of the focus lens unit 204 detected by a focus lens position detector 302. Hereinafter, the position of the focus lens unit 204 is also referred to as a focus lens position.

The focus controller 224 limits the drive control function (the focus control function) of the focus lens unit 204 in accordance with the focus limit signal outputted from the function limit controller 220. When the focus limit signal is ON, the focus controller 224 does not output a control signal for moving the focus lens unit 204 to the focus lens driver 205, regardless of the input from the focus drive command input portion 902. In other words, the focus controller 224 does not output the control signal even if the focus command signal is inputted. Or, even if the focus controller 224 outputs the control signal, a current focus position is maintained.

When the focus limit signal is OFF, the focus controller 224 outputs a control signal for moving the focus lens unit 204 to the focus lens driver 205 in accordance with the focus command signal from the focus drive command input portion 902.

Reference numeral 300 denotes a focus drive controller which is mounted onto the television lens 200 and controls the drive of the focus lens unit 204. Reference numeral 301 denotes a focus motor as an actuator which receives an output of the focus lens driver 205 to drive the focus lens unit 204. Reference numeral 302 denotes a focus position detector which is constituted of an encoder, a potentiometer, or the like, and detects a position of the focus lens unit 204.

Reference numeral 400 denotes a zoom drive controller which is mounted onto the television lens 200 and controls the drive of the zoom lens unit 202. Reference numeral 401 denotes a zoom motor as an actuator which receives an output of the zoom lens driver 203 to drive the zoom lens unit 202. Reference numeral 402 denotes a zoom position detector which is constituted of an encoder, a potentiometer, or the like, and detects a position of the zoom lens unit 202.

Reference numeral 600 denotes a tally module which is constituted of a tarry driver 601 and a tally light emitting portion 602 described below. Reference numeral 601 denotes the tally module which amplifies the tally signal outputted from the lens system microcomputer 201 to output it as a light emitting signal to the tally light emitting portion 602 to emit light from the tally light emitting portion 602. Reference numeral 602 denotes the tally light emitting portion which lights up to display that it is a camera system in which a shot image is being recorded or on air.

Reference numeral 700 denotes a heater module which is mounted onto the television lens 200. The heater module 700 heats up the image-pickup optical system or a movable portion that is a part of the television lens 200 when the camera system is used outdoors at a cold region or in winter to reduce the loss of transparency of the image-pickup optical system or prevent grease applied to the movable portion from being hardened. Reference numeral 701 denotes a heater that is a heat generating portion of the heater module 700, and reference numeral 702 denotes a heater driver which applies current to the heater 701 to generate heat. Reference numeral 703 denotes a heater operation command input portion which outputs a heater operation command signal (a heater operation instruction signal) that instructs the operation (the generation of the heat) of the heater 701 and a heater stop command signal that stops the operation of the heater 701.

Reference numeral 902 denotes a focus drive command input portion which is operated by a camera operator and generates a drive command (a focus command signal) of the focus lens unit 204. Reference numeral 903 denotes a zoom drive command input portion which is operated by the camera operator and generates a drive command (a zoom command signal) of the zoom lens unit 202. When the camera operator operates the focus drive command input portion 902 or the zoom drive command input portion 903, the focus command signal or the zoom command signal outputted in accordance with its operation amount is inputted to the lens system microcomputer 201.

Each of the zoom controller 223 and the focus controller 224 in the lens system microcomputer 201 calculates positions to which the zoom lens unit 202 and the focus lens unit 204 are to be moved, based on the input zoom command signal and focus command signal. Furthermore, each of the zoom controller 223 and the focus controller 224 performs a positioning control so that the calculated zoom position and focus position coincide with position information outputted from the zoom lens position detector 402 and the focus lens position detector 302, respectively.

Reference numeral 1000 denotes a power supply which is connected with the television camera 100 and supplies current to the television camera 100. Reference numeral 1001 denotes a lens-camera communication circuit which communicates information by a serial communication, a parallel communication, an analog communication, or the like, between the television camera 100 and the television lens 200.

Reference numeral 1002 denotes a tally signal which indicates that the image taken by the camera system is being recorded or on air. The tarry signal 1002 is inputted from a system such as a broadcasting station to the television camera 100. Furthermore, the tally signal 1002 is inputted to the lens system microcomputer 201 via the camera system microcomputer 101 and the lens-camera communication circuit 1001 described below. The lens system microcomputer 201 to which the tally signal 1002 has been inputted controls the turning on and off of the tally light emitting portion 602 via the tally driver 601.

The operation of the lens system microcomputer 201 (the function limit controller 220, the limit function setting portion 221, the heater operation command setting portion 222, the zoom controller 223, and the focus controller 224) in the camera system will be described with reference to a flowchart of FIG. 2. The operation is performed in accordance with a computer program stored in a memory (not shown) provided in the lens system microcomputer 201.

In Step 2000, a process of the lens system microcomputer 201 is started. The lens system microcomputer 201 performs a process illustrated in a flowchart of FIG. 2 at predetermined time intervals.

In next Step 2001, the lens system microcomputer 201 confirms a status of the tally signal. When the tally signal is in an ON-state, i.e. the camera system is in a state where the shot image is being recorded or broadcasted, the flow moves to Step 2002. On the other hand, when the tally signal is in an OFF-state, i.e. the shot image is not being recorded or broadcasted, the flow moves to Step 2006.

In Step 2002, the lens system microcomputer 201 confirms a setting status of the limit function setting portion 221. When the limit function setting portion 221 sets the function limit to be effective (On-state), the flow moves to Step 2003. On the other hand, when it sets the function limit to be ineffective (OFF-state), the flow proceeds to Step 2006.

In Step 2003, the lens system microcomputer 201 (the function limit controller 220) sets the heater limiting signal to ON to limit the operation of the heater 701. Due to the processes from Step 2000 to Step 2003, the operation of the heater 701 is inevitably limited when the function limit is effective in a state where the shot image is being recorded or broadcasted.

Figure 7:
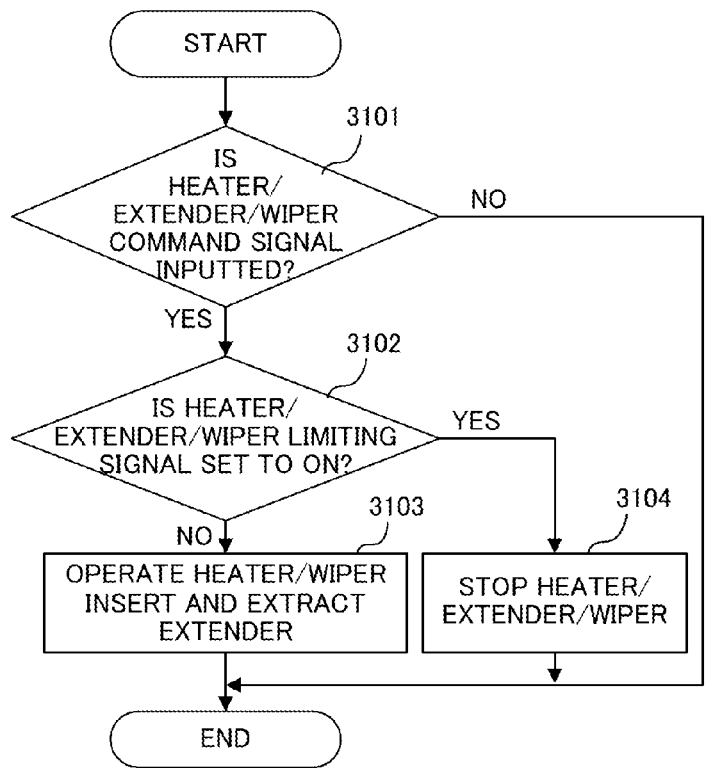
FIG. 7 is a flowchart illustrating controls of a heater, an extender, and a wiper in Embodiments 1 to 3.

FIG. 7 illustrates an operation of the heater operation command setting portion 222. In Step 3101, the heater operation command setting portion 222 determines whether or not the heater operation command signal is inputted. When the heater operation command signal is not inputted, the process is finished. On the other hand, when the operation command signal is inputted, the flow proceeds to Step 3102 and the heater operation command setting portion 222 determines whether or not the heater limiting signal is ON.

When the heater limiting signal is OFF, the flow proceeds to Step 3103 and the heater operation command setting portion 222 outputs the heater operation control signal to the heater driver 702 in accordance with the heater operation command signal to operate the heater 701.

On the other hand, when the heater limiting signal is ON, the flow proceeds to Step 3104 and the heater operation command setting portion 222 outputs the heater stop control signal to the heater driver 702 even if the heater operation command signal is inputted so as not to operate the heater 701, i.e. so as to stop the heater 701.

Figure 2:
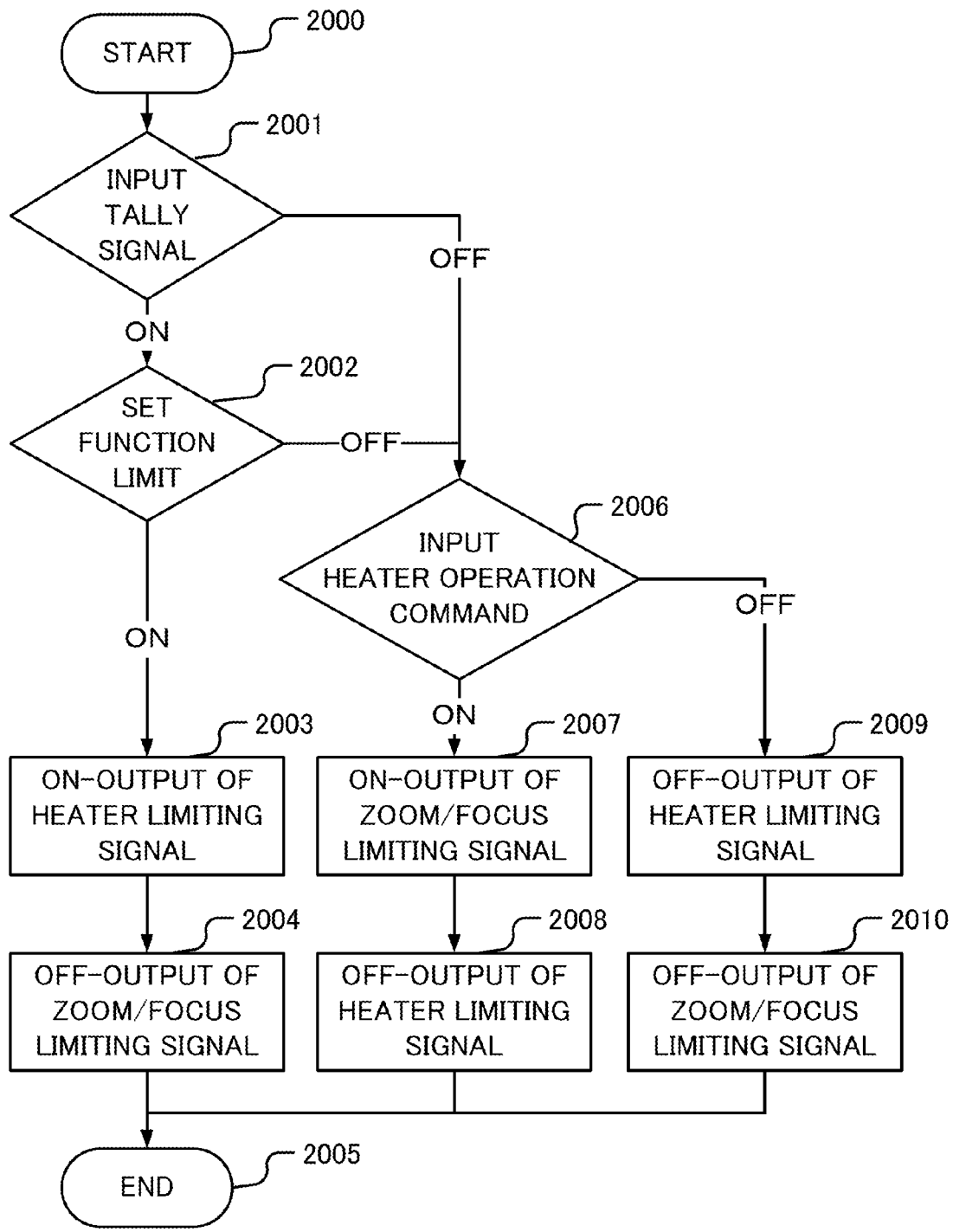
FIG. 2 is a flowchart illustrating a function limit control in Embodiment 1.

In FIG. 2, in Step 2004, the lens system microcomputer 201 (the function limit controller 220) sets the zoom limiting signal and the focus limiting signal to OFF to permit the zoom operation and the focus operation. Then, the flow moves to Step 2005 to finish the process. After the process is finished, the lens system microcomputer 201 controls the drive of the zoom lens unit 202 using the zoom controller 223 and controls the drive of the focus lens unit 204 using the focus controller 224.

When the flow proceeds from Steps 2001 and 2002 to Step 2006, the lens system microcomputer 201 (the function limit controller 220) confirms an input signal from the heater operation command input portion 703. If the input signal is the heater operation command signal, the flow moves to Step 2007. On the other hand, if the input signal is the heater stop operation command signal, the flow moves to Step 2009.

In Step 2007, the lens system microcomputer 201 (the function limit controller 220) sets the zoom limiting signal and the focus limiting signal to ON to limit the zoom operation and the focus operation, and then the flow moves to Step 2008.

In the present embodiment, the limitation is performed by setting the zoom limiting signal and the focus limiting signal at the same time, but the similar effect can also be obtained by setting only one of the signals is set.

Figure 8:
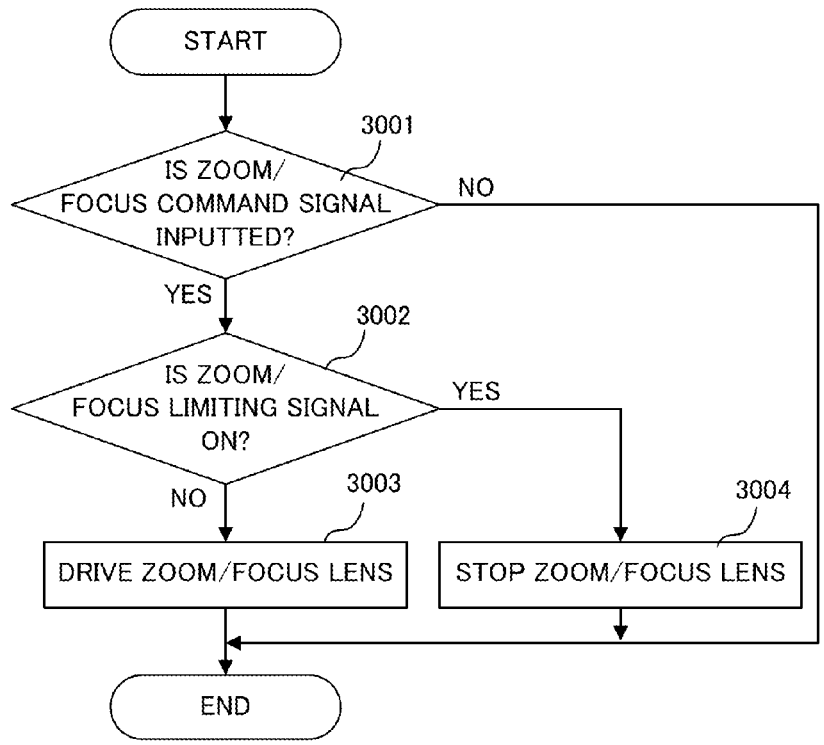
FIG. 8 is a flowchart illustrating a zoom control and a focus control in Embodiment 1.

FIG. 8 illustrates the operations of the zoom controller 223 and the focus controller 224 collectively. The zoom controller 223, in Step 3001, determines whether or not the zoom command signal is inputted. If the zoom command signal is inputted, the flow proceeds to Step 3002 and the zoom controller 223 determines whether or not the zoom limiting signal is ON.

When the zoom limiting signal is OFF, the flow proceeds to Step 3003 and the zoom controller 223 outputs the zoom control signal in accordance with a zoom drive amount instructed by the zoom command signal from the zoom drive command input portion 903 to the zoom lens driver 203. Thus, the zoom lens unit 202 is driven to a target zoom lens position which is obtained by adding the current zoom lens position and the instructed zoom drive amount.

On the other hand, if the zoom limiting signal is ON, the flow proceeds to Step 3004 and the zoom controller 223 sets the zoom drive amount instructed by the zoom command signal to zero. Thus, the drive of the zoom lens unit 202 from the current zoom lens position, i.e. the zoom operation, is limited, and the zoom lens unit 202 remains stopped.

The focus controller 224, in Step 3001, determines whether or not the focus command signal is inputted. If the focus command signal is inputted, the flow proceeds to Step 3002 and the focus controller 224 determines whether or not the focus limiting signal is ON.

When the focus limiting signal is OFF, the flow proceeds to Step 3003. In Step 3003, the focus controller 224 outputs the focus control signal in accordance with the focus lens position instructed by the focus command signal from the focus drive command input portion 902 to the focus lens driver 205. Thus, the focus lens unit 204 is driven from the current focus lens position to the instructed focus lens position.

On the other hand, if the focus limiting signal is ON, the flow proceeds to Step 3004 and the focus controller 224 sets the focus lens position instructed by the focus command signal to the current focus lens position. Thus, the drive of the focus lens unit 204 from the current focus lens position, i.e. the focus operation, is limited, and the focus lens unit 204 remains stopped.

In FIG. 2, in Step 2008, the lens system microcomputer 201 sets the heater limiting signal to OFF to cancel the limit of the operation of the heater 701, i.e. permit the operation of the heater 701, and the flow moves to Step 2005. When the limit of the operation of the heater 701 is cancelled, the heater operation command setting portion 222 operates and stops the heater 701 in accordance with the heater operation command signal and the heater stop command signal from the heater operation command input portion 703.

In a process subsequent to Step 2008, since the lens system microcomputer 201 confirmed that the heater operation command signal had been inputted in Step 2006, it instructs the heater operation command setting portion 222 so as to set "operation" of the heater 701.

In Step 2009, the lens system microcomputer 201 sets the heater limiting signal to OFF to cancel the limit of the operation of the heater 701, i.e. permit the operation of the heater 701. Then, in Step 2010, since the lens system microcomputer 201 confirmed that the heater stop command signal had been inputted in Step 2006, it instructs the heater operation command setting portion 222 so as to stop the operation of the heater 701.

Next, in Step 2010, the lens system microcomputer 201 (the function limit controller 220) sets the zoom limiting signal and the focus limiting signal to OFF to permit the zoom operation and the focus operation, and the flow moves to Step 2005.

As described above, in the present embodiment, when the tally signal is ON, the operation of the heater 701 in accordance with the input of the heater operation command signal is limited, and the zoom operation and the focus operation, i.e. the drives of the zoom lens unit 202 and the focus lens unit 204 are permitted. When the tally signal is changed to ON during the operation of the heater 701, the operation of the heater 701 is stopped and the zoom operation and the focus operation are permitted. Thus, a state in which the zoom operation or the focus operation cannot be comfortably performed while the shot image is being recorded or broadcasted due to the shortage of the power caused by the operation of the heater 701 can be prevented.

[Embodiment 2]

Figure 3:
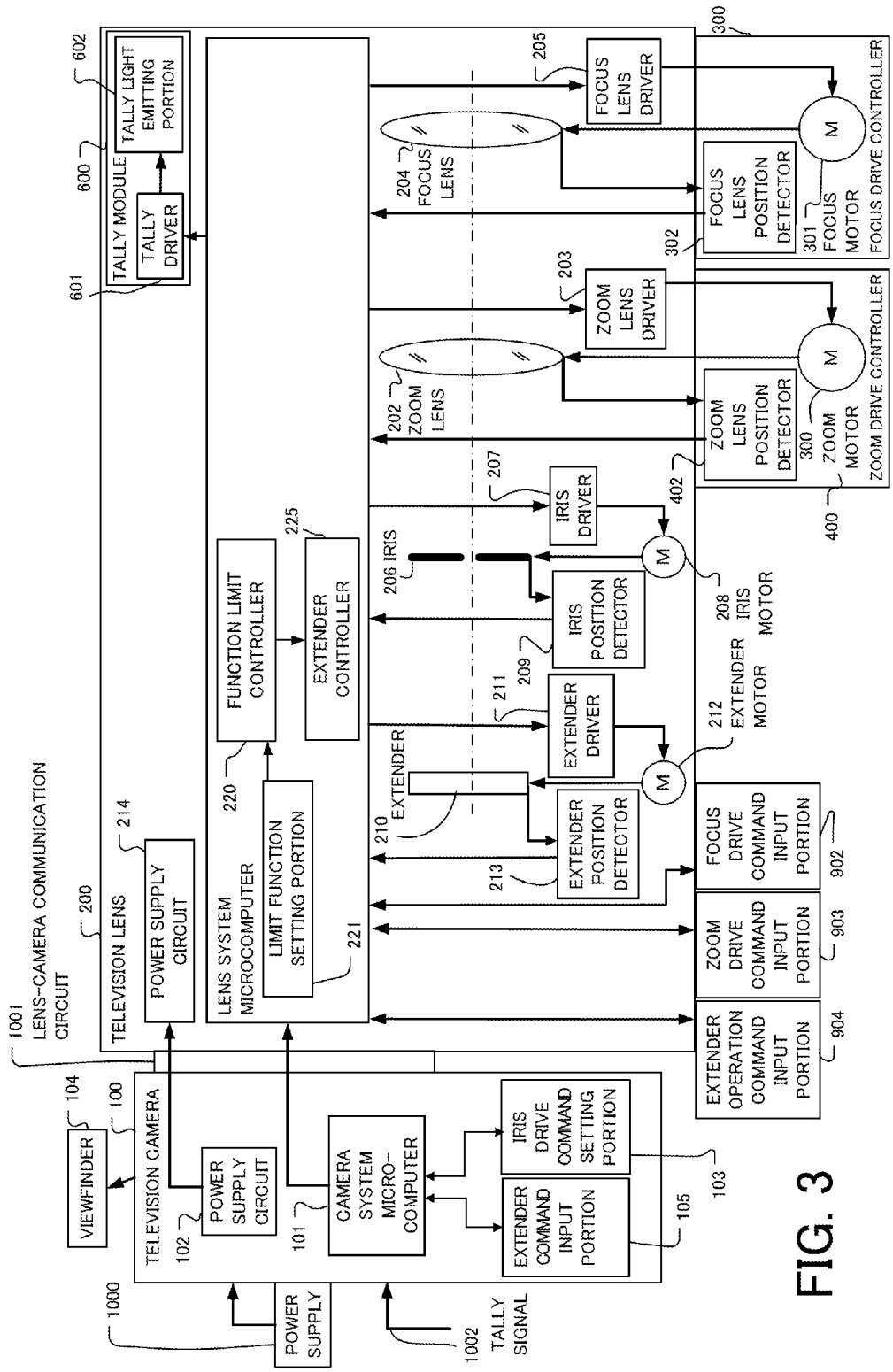
FIG. 3 is a block diagram illustrating a configuration of a camera system that is Embodiment 2 of the present invention.

FIG. 3 illustrates a configuration of a camera system that is Embodiment 2 of the present invention. In the drawing, the elements common to those of Embodiment 1 will be denoted by the same reference numerals as those of Embodiment 1 and descriptions thereof will be omitted.

In the present embodiment, when the tally signal is ON, the lens system microcomputer 201 (the function limit controller 220) limits the insertion and the extraction of the extender 210. Reference numeral 225 denotes an extender controller, and reference numeral 904 denotes an extender operation command input portion.

The tally signal 1002 inputted to the television camera 100 is inputted to the lens system microcomputer 201 via the camera system microcomputer 101 and the lens-camera communication circuit 1001. The extender command signal from the extender command input portion 105 provided in the television camera 100 is inputted to the lens system microcomputer 201 via the lens-camera communication circuit 1001.

The extender operation command input portion 904 has the same function as that of the extender command input portion 105, and outputs the extender command signal to the lens system microcomputer 201 in accordance with the operation for instructing the insertion or the extraction of the extender 210.

The function limit controller 220 of the lens system microcomputer 201 outputs the extender control signal to the extender controller 225, based on the limit setting of the extender function in the function limit setting portion 221 and the status of the input tally signal. The extender controller 225 controls or limits the insertion and the extraction of the extender 210 based on the extender limiting signal and the input extender command signal.

Figure 4:
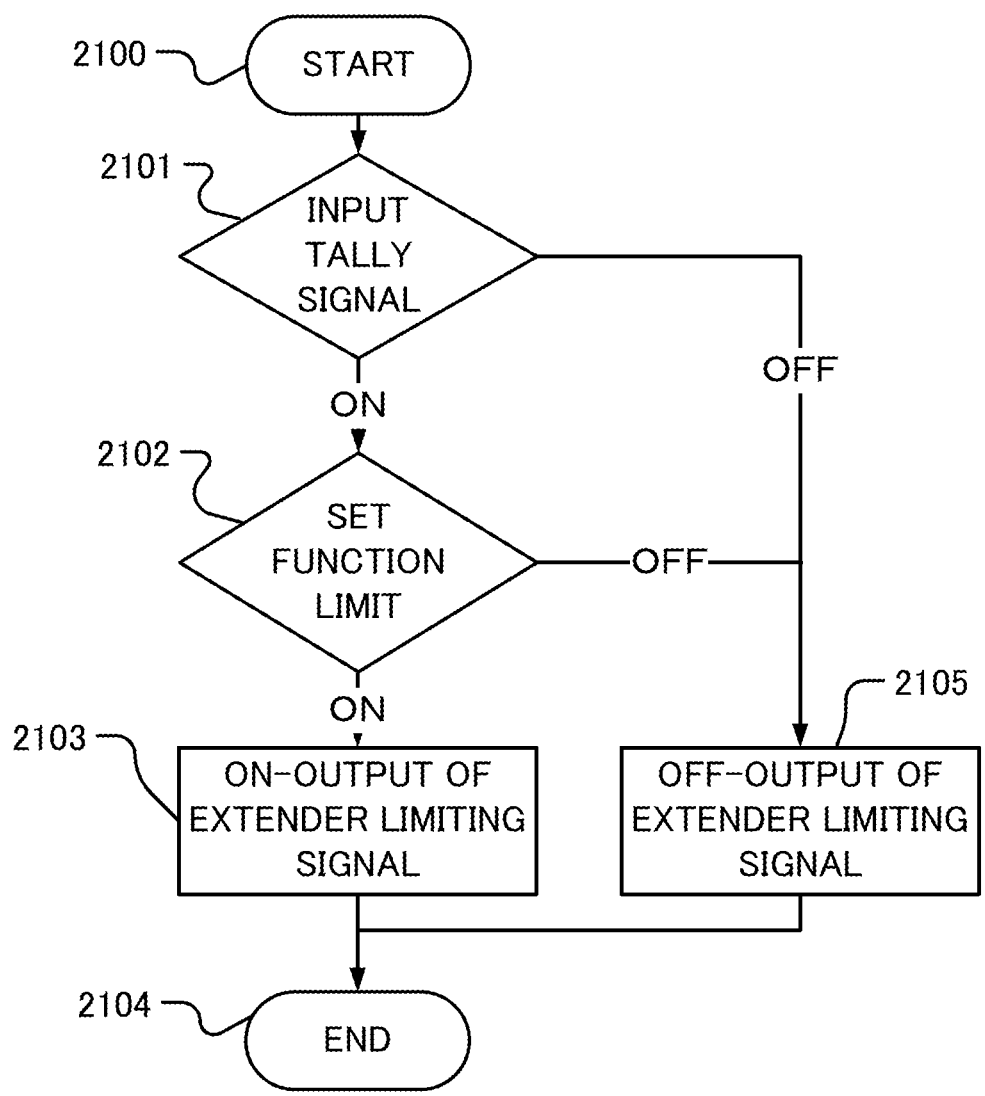
FIG. 4 is a flowchart illustrating a function limit control in Embodiment 2.

The operation of the lens system microcomputer 201 (the function limit controller 220, the limit function setting portion 221, and the extender controller 225) in the camera system will be described with reference to the flowchart of FIG. 4. The operation is performed in accordance with a computer program stored in a memory (not shown) which is provided in the lens system microcomputer 201.

In Step 2100, the process of the lens system microcomputer 201 is started. The lens system microcomputer 201 performs a process illustrated in the flowchart of FIG. 4 at predetermined time intervals.

In Step 2101, the lens system microcomputer 201 confirms the status of the tally signal. When the tally signal is in an ON-state, i.e. the shot image is being recorded or broadcasted in the camera system, the flow moves to Step 2102. On the other hand, when the tally signal is in an OFF-state, i.e. the shot image is not being recorded or broadcasted, the flow moves to Step 2105.

In Step 2102, the lens system microcomputer 201 confirms the setting status of the limit function setting portion 221. If the limit function setting portion 221 is in a state where the function limit is effective (ON-state), the flow moves to Step 2103. On the other hand, if the limit function setting portion 221 is in a state where the function limit is ineffective (OFF-state), the flow moves to Step 2105.

In Step 2103, the lens system microcomputer 201 (the function limit controller 220) sets the extender limiting signal to ON to limit the insertion and the extraction of the extender 210. Then, the flow proceeds to Step 2104 to finish the process.

On the other hand, in Step 2105, the lens system microcomputer 201 (the function limit controller 220) sets the extender limiting signal to OFF to permit the insertion and the extraction of the extender 210. Then, the flow proceeds to Step 2104 to finish the process.

FIG. 7 illustrates the operation of the extender controller 225. In Step 3101, the extender controller 225 confirms whether or not the extender command signal is inputted from the extender operation command input portion 904 and the extender command input portion 105. If the extender command signal is not inputted, the process is finished. On the other hand, if the extender command signal is inputted, the flow proceeds to Step 3102 and the extender controller 225 determines whether or not the extender limiting signal is ON.

When the extender limiting signal is OFF, i.e. the insertion and the extraction of the extender 210 is permitted, the flow proceeds to Step 3103. In this case, the extender controller 225 sets a extender position command value (a turret position command value) corresponding to the extender lens element to be inserted into the image-pickup optical system or all the extender lens elements to be extracted, based on the extender command signal. Then, the extender controller 225 drives the extender motor 212 via the extender driver 211 so that the position of the extender 210 detected by the extender position detector 213 coincides with the extender position command value.

On the other hand, when the extender limiting signal is ON, the flow proceeds to Step 3104. In this case, the extender controller 225 does not control the insertion and the extraction of the extender 210 even if the extender command signal is inputted, and the extender 210 remains stopped.

As described above, in the present embodiment, when the tally signal is ON, the insertion and the extraction of the extender 210 in accordance with the input of the extender command signal is limited. Thus, the shot image that is out of focus due to the insertion and the extraction of the extender 210 or that includes the image of the insertion and the extraction of the extender 210 is being recorded or broadcasted can be prevented.

In the present embodiment, as an example, the extender lens is described as an optical element which is inserted into and extracted from the image-pickup optical system, but similarly, the insertion and the extraction can also be limited or permitted in a case where the insertion and the extraction of an optical filter such as a neutral density filter or an infrared filter or other optical elements can be performed.

[Embodiment 3]

Figure 5:
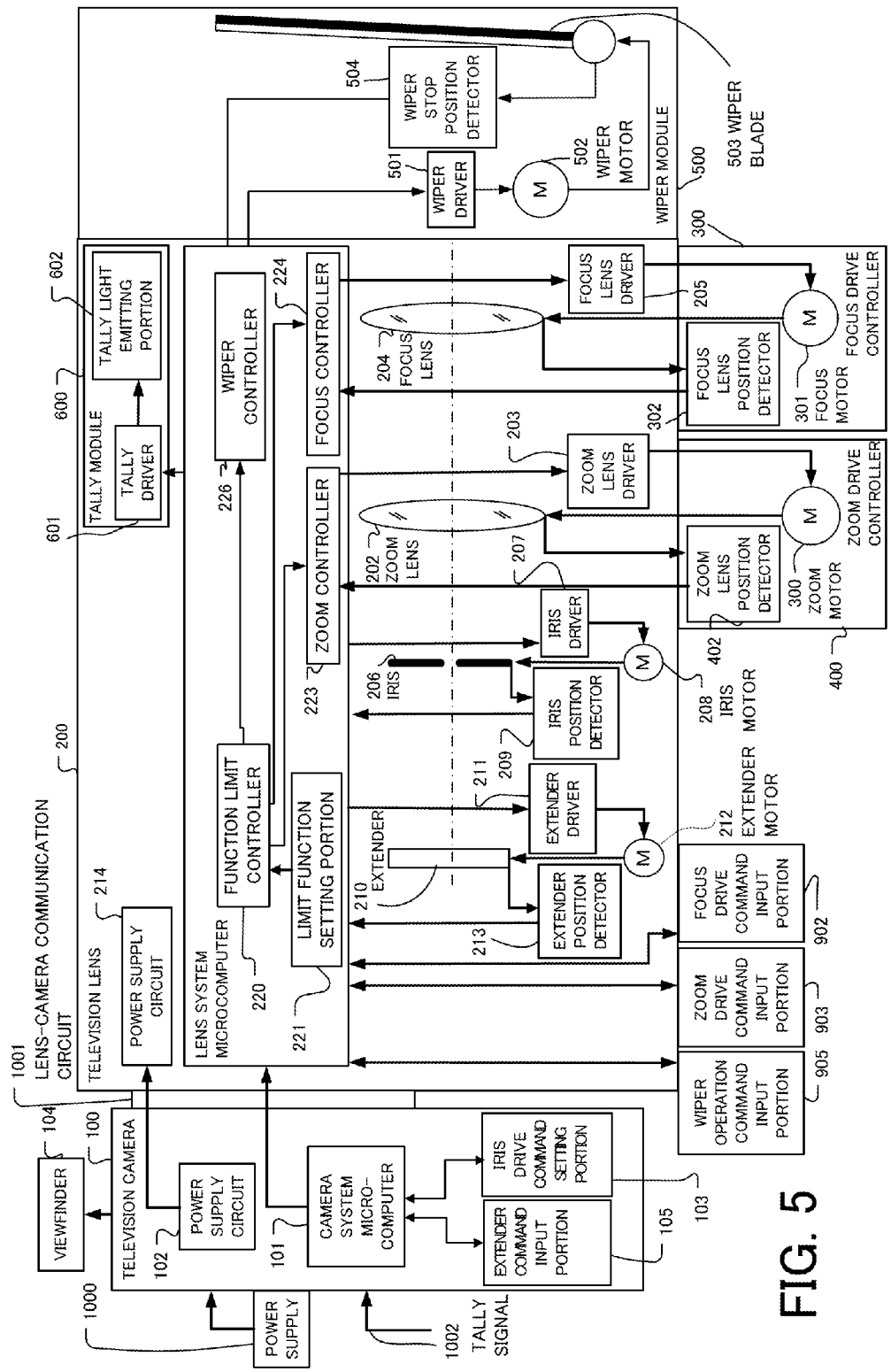
FIG. 5 is a block diagram illustrating a configuration of a camera system that is Embodiment 3 of the present invention.

FIG. 5 illustrates a configuration of a camera system that is Embodiment 3 of the present invention. In the drawing, the elements common to those of Embodiment 1 will be denoted by the same reference numerals as those of Embodiment 1 and descriptions thereof will be omitted.

In the present embodiment, when the tally signal is ON, the lens system microcomputer 201 (the function limit controller 220) limits the operation of a wiper.

Reference numeral 500 denotes a wiper module including a wiper blade 503 which wipes a lens surface so as to remove water droplet adhered to a front surface (a lens surface closest to an object side) of the television lens 200. The wiper module 500 includes a wiper motor 502, a wiper driver 501 which drives the wiper motor 502, and a wiper blade 503 which is driven by the wiper motor 502. Furthermore, the wiper module 500 includes a wiper stop position detector 504 which detects a stop position of the wiper blade 503.

The wiper stop position detector 504 outputs a signal indicating a stop state when the wiper blade 503 is positioned in a predetermined range, and outputs a signal indicating an operation state when it is positioned out of the range.

Reference numeral 905 denotes a wiper operation command input portion which is operated for instructing the operation of the wiper module 500, and reference numeral 226 denotes a wiper controller which is provided in the lens system microcomputer 201 and controls the operation of the wiper module 500.

The tally signal 1002 inputted to the television camera 100 is inputted to the lens system microcomputer 201 via the camera system microcomputer 101 and the lens-camera communication circuit 100.

When the operation is performed, the wiper operation command input portion 905 outputs a wiper operation command signal (a wiper operation instruction signal) or a wiper stop command signal to the lens system microcomputer 201. The function limit controller 220 outputs a wiper limiting signal to the wiper controller 226, based on the limit setting of a wiper function in the function limit setting portion 221, the state of the input tally signal, and the detection state by the wiper stop position detector 504.

The function limit controller 220 outputs the zoom limiting signal and the focus limiting signal based on the limit setting of the zoom control function and the focus control function in the function limit setting portion 221, the state of the inputted tally signal, and the detection state by the wiper stop position detector 504. The zoom limiting signal and the focus limiting signal are outputted to the zoom controller 223 and the focus controller 224, respectively.

The wiper controller 226 operates and stops the wiper module 500 based on the wiper limiting signal, the wiper operation command signal or the wiper stop command signal, and the detection state of the wiper stop position detector 504. Hereinafter, the operation and the stop of the wiper module 500 are referred to as a wiper operation and a wiper stop, respectively.

The operation of the lens system microcomputer 201 (the function limit controller 220, the limit function setting portion 221, the wiper controller 226, the zoom controller 223, and the focus controller 224) in the camera system will be described with reference to the flowchart of FIG. 6. The operation is performed in accordance with a computer program stored in a memory (not shown) which is provided in the lens system microcomputer 201.

In Step 2200, the process of the lens system microcomputer 201 is started. The lens system microcomputer 201 performs a process illustrated in the flowchart of FIG. 6 at predetermined time intervals.

In Step 2201, the lens system microcomputer 201 confirms the state of the tally signal. When the tally signal is in an ON-state, i.e. the shot image is being recorded or broadcasted in the camera system, the flow moves to Step 2202. On the other hand, when the tally signal is in an OFF-state, i.e. the shot image is not being recorded or broadcasted, the flow moves to Step 2207.

In Step 2202, the lens system microcomputer 201 confirms the setting state of the limit function setting portion 221. When the limit function setting portion 221 is in a state where the function limit is effective (in the ON-state), the flow moves to Step 2203. On the other hand, when it is in a state where the function limit is ineffective (in the OFF-state), the flow moves to Step 2207.

In Step 2203, the lens system microcomputer 201 (the function limit controller 220) sets the wiper limiting signal to ON to limit the wiper operation. Then, in Step 2204, the lens system microcomputer 201 confirms the detection state by the wiper stop position detector 504. In a state of the wiper stop, the flow moves to Step 2205. On the other hand, in a state of the wiper operation, the flow moves to Step 2206 to finish the process.

In Step 2205, the lens system microcomputer 201 (the function limit controller 220) sets the zoom limiting signal and the focus limiting signal to OFF to permit the zoom operation and the focus operation, and then the flow moves to Step 2206 to finish the process. After the process is finished, the lens system microcomputer 201 controls the drive of the zoom lens unit 202 using the zoom controller 223 and controls the drive of the focus lens unit 204 using the focus controller 224.

Proceeding from Steps 2201 and 2202 to Step 2207, the lens system microcomputer 201 (the function limit controller 220) determines whether or not the wiper operation command signal is inputted from the wiper operation command input portion 905. If the wiper operation command signal is inputted, the flow moves to Step 2208. On the other hand, if the wiper operation command signal is not inputted, the flow moves to Step 2210.

In Step 2208, the lens system microcomputer 201 (the function limit controller 220) sets the zoom limiting signal and the focus limiting signal to ON to limit the zoom operation and the focus operation. Then, the flow moves to Step 2209.

The zoom controller 223, as described with reference to FIG. 8 in Embodiment 1, outputs the zoom control signal in accordance with the zoom drive amount instructed by the zoom command signal from the zoom drive command input portion 903 to the zoom lens driver 203 when the zoom control signal is OFF. Thus, the zoom lens unit 202 is driven to a target zoom lens position. On the other hand, the zoom controller 223 limits the drive of the zoom lens unit 202 from the current zoom lens position when the zoom limiting signal is ON.

The focus controller 224 also operates as described with reference to FIG. 8 in Embodiment 1. In other words, when the focus limiting signal is OFF, the focus controller 224 outputs the focus control signal in accordance with the focus lens position instructed by the focus command signal from the focus drive command input portion 902 to the focus lens driver 205. Thus, the focus lens unit 204 is driven to the instructed focus lens position from the current focus lens position. On the other hand, when the focus limiting signal is ON, the focus controller 224 limits the drive of the focus lens unit 204 from the current focus lens position.

In Step 2209, the lens system microcomputer 201 (the function limit controller 220) sets the wiper limiting signal to OFF to permit the wiper operation. Then, the flow moves to Step 2206.

FIG. 7 illustrates the operation of the wiper controller 226. In Step 3101, the wiper controller 226 determines whether or not the wiper operation command signal is inputted from the wiper operation command input portion 905. When the wiper operation command signal is not inputted, the process is finished. On the other hand, when the wiper operation command signal is inputted, the flow proceeds to Step 3102 and the wiper controller 226 determines whether or not the wiper control signal is ON.

When the wiper limiting signal is OFF, the flow proceeds to Step 3103 and the wiper controller 226 performs a process for the wiper operation based on the wiper operation command signal from the wiper operation command input portion 905 and the detection state by the wiper stop position detector 504.

On the other hand, when the wiper limiting signal is ON, the flow proceeds to Step 3104 and the wiper controller 226 outputs the wiper stop control signal to the wiper driver 501 even if the wiper operation command signal is inputted so as not to perform the wiper operation, i.e. so as to remain stopped.

Figure 6:
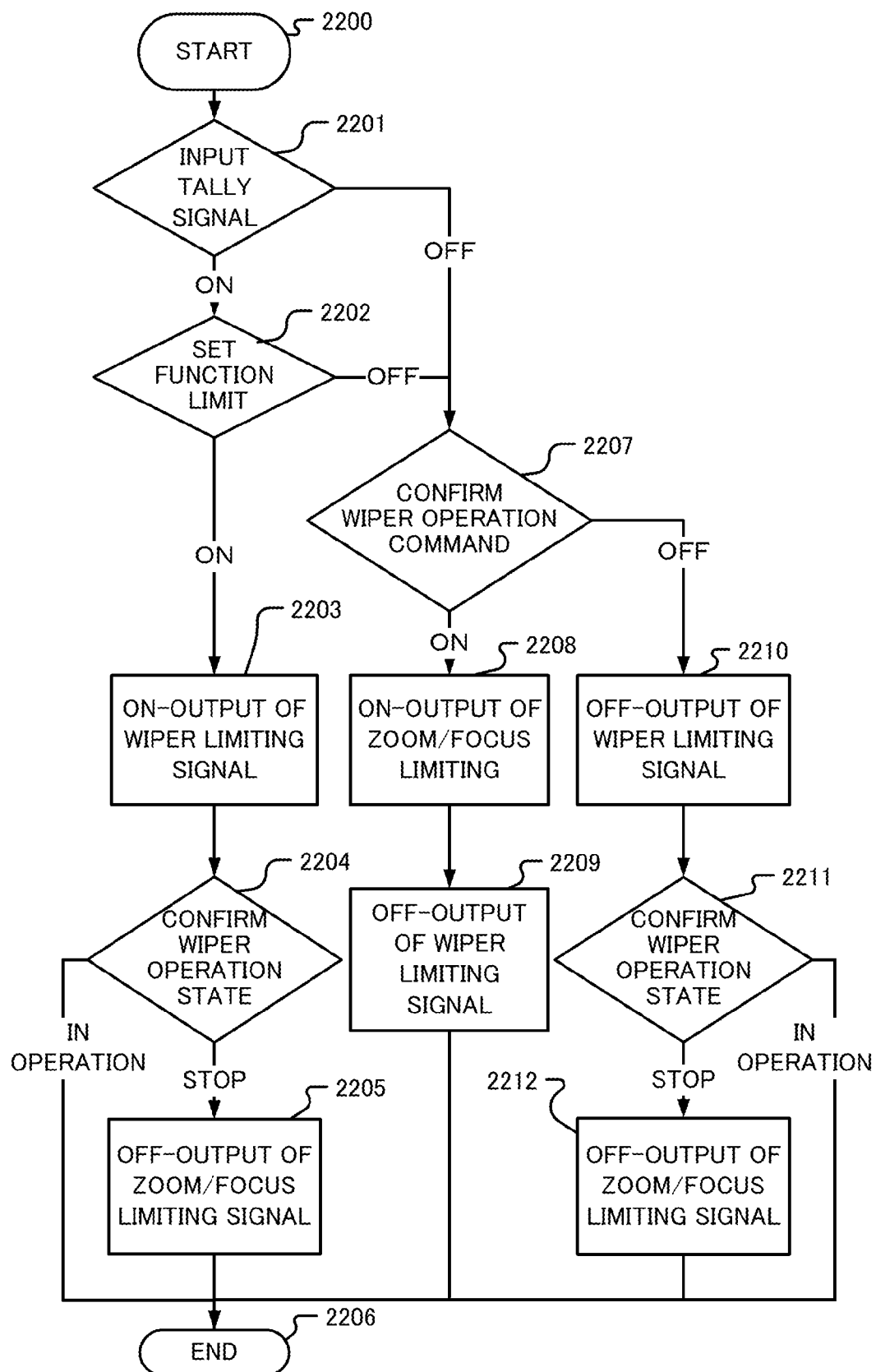
FIG. 6 is a flowchart illustrating a function limit control in Embodiment 3.

Also in Step 2210 of FIG. 6, the lens system microcomputer 201 (the function limit controller 220) sets the wiper limiting signal to OFF to permit the wiper operation. Then, the flow moves to Step 2211.

In Step 2211, the lens system microcomputer 201 confirms the detection state by the wiper stop position detector 504. In the case of the wiper stop, the flow moves to Step 2212. On the other hand, in the case of the wiper operation, the flow moves to Step 2206 to finish the process.

In Step 2212, the lens system microcomputer 201 (the function limit controller 220) sets the zoom limiting signal and the focus limiting signal to OFF to permit the zoom operation and the focus operation. Then, the flow moves to Step 2206 to finish the process. After the process is finished, the lens system microcomputer 201 controls the drive of the zoom lens unit 202 using the zoom controller 223, and controls the drive of the focus lens unit 204 using the focus controller 224.

As described above, in the present embodiment, when the tally signal is ON, the wiper operation in accordance with the input of the wiper operation command signal is limited and the zoom operation or the focus operation is permitted. On the other hand, when the tally signal is ON during the wiper operation, the wiper operation is stopped and the zoom operation or the focus operation is permitted. Thus, a state in which the zoom operation or the focus operation cannot be comfortably performed while the shot image is being recorded or broadcasted due to the shortage of the power caused by the wiper operation can be prevented. Furthermore, the operating noise of the wiper is prevented from being recorded or broadcasted along with the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-225546, filed Sep. 29, 2009 which is hereby incorporated by reference herein in its entirety.

What is claimed is:

1. A lens apparatus removably mounted onto a camera, the lens apparatus comprising:
    an image-pickup optical system configured to guide an image pickup light from an object to the camera, the image-pickup optical system including a zoom lens unit that moves during zooming, a focusing lens unit that moves during focusing, and an optical element configured to be inserted into and extracted from a light path of the image-pickup optical system;
    a controller configured to control operations of the zoom lens unit, the focusing lens unit, and the optical element; and
    a tally emitting part configured to emit light based on a tally signal obtained from an external system disposed at a different position from the camera and the lens apparatus,
    wherein the controller is configured to,
    when the tally emitting part emits light, limit an insertion/extraction of the optical element without limiting the operations of the zoom lens unit and the focusing lens unit, and
    when the tally emitting part does not emit light, limit none of the operations of the optical element, the zoom lens unit and the focusing lens unit.

2. A lens apparatus removably mounted onto a camera, the lens apparatus comprising:
    an image-pickup optical system configured to guide an image pickup light from an object to the camera, the image-pickup optical system including a zoom lens unit that moves during zooming, a focusing lens unit that moves during focusing, and a heater configured to heat at least a part of the lens apparatus;
    a controller configured to control operations of the zoom lens unit, the focusing lens unit, and the heater; and
    a tally emitting part configured to emit light based on a tally signal obtained from an external system disposed at a different position from the camera and the lens apparatus,
    wherein the controller is configured to,
    when the tally emitting part emits light, limit the operation of the heater without limiting the operations of the zoom lens unit and the focusing lens unit, and
    when the tally emitting part does not emit light, limit none of the operations of the heater, the zoom lens unit and the focusing lens unit.

3. A lens apparatus removably mounted onto a camera, the lens apparatus comprising:
    an image-pickup optical system configured to guide an image pickup light from an object to the camera, the image-pickup optical system including a zoom lens unit that moves during zooming, a focusing lens unit that moves during focusing, and a wiper configured to wipe a front surface of the image pickup optical system;
    a controller configured to control operations of the zoom lens unit, the focusing lens unit, and the wiper; and
    a tally emitting part configured to emit light based on a tally signal obtained from an external system disposed at a different position from the camera and the lens apparatus,
    wherein the controller is configured to,
    when the tally emitting part emits light, limit the operation of the wiper without limiting the operations of the zoom lens unit and the focusing lens unit, and
    when the tally emitting part does not emit light, limit none of the operations of the wiper, the zoom lens unit and the focusing lens unit.

4. A camera system comprising:
the lens apparatus according to claim 1; and
a camera onto which the lens apparatus is removably mounted.

5. A camera system comprising:
the lens apparatus according to claim 2; and
a camera onto which the lens apparatus is removably mounted.

6. A camera system comprising:
the lens apparatus according to claim 3; and
a camera onto which the lens apparatus is removably mounted.

\* \* \* \* \*